(12) United States Patent
Bunschoten et al.

(10) Patent No.: US 6,325,100 B1
(45) Date of Patent: Dec. 4, 2001

(54) COUPLING

(75) Inventors: Gerrit Klaas Bunschoten; Brian David Haworth; Lambertus Gerardus van der Heijden, all of Maarssen (NL)

(73) Assignee: Diversey Lever, Inc., Plymouth, MI (US)

(*) Notice: Subject to any disclaimer, the term of this patent is extended or adjusted under 35 U.S.C. 154(b) by 0 days.

(21) Appl. No.: 09/593,611

(22) Filed: Jun. 13, 2000

(51) Int. Cl.$^7$ .................................................. F16K 51/00
(52) U.S. Cl. .................. 137/614.04; 222/321.9; 251/149.6
(58) Field of Search ............... 257/149.6; 137/614.04; 222/321.7, 321.9

(56) References Cited

U.S. PATENT DOCUMENTS

| | | |
|---|---|---|
| 2,509,444 | 5/1950 | Mitchell . |
| 3,568,736 * | 3/1971 | Linch et al. ............ 137/614.04 X |
| 3,972,387 * | 8/1976 | Braun .................... 137/614.04 X |
| 4,119,111 * | 10/1978 | Allread .................. 251/149.6 X |
| 4,221,235 * | 9/1980 | Maldavs ................. 137/614.04 |
| 4,582,295 * | 4/1986 | Kugler et al. ........... 137/614.04 X |
| 4,609,004 * | 9/1986 | Greene et al. .......... 251/149.6 X |
| 4,949,745 | 8/1990 | McKeon . |
| 4,951,710 | 8/1990 | Kotake . |
| 5,211,197 | 5/1993 | Marrison et al. . |
| 5,346,177 * | 9/1994 | Paulsen et al. .......... 251/149.6 |
| 5,425,404 * | 6/1995 | Dyer ..................... 222/325 X |
| 5,450,875 * | 9/1995 | Chichester et al. ....... 251/149.6 X |
| 5,544,858 * | 8/1996 | Rogers et al. ........... 251/149.6 |
| 6,095,190 * | 8/2000 | Wilcox et al. ........... 251/149.6 X |

FOREIGN PATENT DOCUMENTS

| | | |
|---|---|---|
| 0 270 302 | 6/1988 | (EP) . |
| 0 448 922 | 10/1991 | (EP) . |
| 0 675 072 | 10/1995 | (EP) . |

OTHER PUBLICATIONS

European Search Report dated Nov. 5, 1999.

* cited by examiner

*Primary Examiner*—Kevin Shaver
*Assistant Examiner*—John Bastianelli

(57) ABSTRACT

The invention pertains to a coupling for a liquid product packaging and dispensing assembly in which liquid is pumped from a container via the coupling through a tube to the point of use. The coupling has a first interconnectable member with a hollow post and a biased sleeve closing openings in the hollow post and a second interconnectable member with a hollow sheath and a biased piston closing an opening at the end of the sheath. The parts are configured so that, upon connection, the post unseats the piston while the sheath displaces the sleeve, thereby allowing liquid flow. An elastic ring is present between the sheath and the sleeve which ring is compressed in the axial direction and expanded in the radial direction toward the post so as to establish a close fit around the post.

10 Claims, 3 Drawing Sheets

COUPLING

FIELD OF THE INVENTION

The present invention pertains to a coupling for interconnecting two hollow bodies, such as a container and a tube.

BACKGROUND OF THE INVENTION

Such a coupling is known from, e.g., European patent application 0 270 302, which describes a coupling for a liquid product packaging and dispensing assembly in which liquid is pumped from a container via the coupling through a tube to the point of use. The coupling has a first interconnectable member with a hollow post and a biased sleeve closing openings in the hollow post and a second interconnectable member with a hollow sheath and a biased piston closing an opening at the end of the sheath. The parts are configured so that, upon connection, the post unseats the piston while the sheath displaces the sleeve, thereby allowing liquid flow. In one form, the container may be collapsible and is preferably situated inside a box for convenience during storage and transport. EP 0 270 302 mentions that a problem arising with such containers resides in that upon uncoupling the container from the tube, residues of the liquid which has been flowing through the coupling between them are apt to be spilled. This can be hazardous if the liquid is noxious, for example if the liquid is a very alkaline product such as industrial mechanical dishwashing liquid. The coupling according to EP 270 302 indeed has the advantage that when it is disconnected both hollow bodies are sealed, and that it reduces or even obviates spillage. Obviously, a close fit of the sheath around the post is valuable for avoiding spillage upon disconnection. However, it appeared that the tight seal provided by the couplings in hand deteriorates during prolonged use. As a result, the couplings start to leak and must be replaced or overhauled prematurely, i.e. while, apart from the parts responsible for the close fit, all the other parts are still in perfect working order. The invention aims to provide a coupling of the above-mentioned type which allows leak-tight connection and disconnection over a period of several years of normal use.

SUMMARY OF THE INVENTION

Accordingly, the coupling of the invention is characterised in that, upon connection of the members, an annular seal is present between the sheath and the sleeve, which seal is activated by the sleeve so as to establish a close fit around the post. The seal preferably is an elastic ring which is compressed in the axial direction and expanded in the radial direction towards the post.

As a result of the elastic properties of the ring and the pressure that is constantly exerted on the ring (in the axial direction of the ring), the shape of the inner surface of the ring is adapted to the shape of the outer surface of the post, even if the shape or diameter of the latter has changed or is irregular due to wear, damage, or manufacturing faults.

DETAILED DESCRIPTION OF THE INVENTION

It will generally be desirable for the various parts to be co-axial, that is to say for the sheath and piston to be co-axial and for the sleeve and post to be co-axial and, moreover, for all four of them to lie on a common axis when coupled.

BRIEF DESCRIPTION OF THE DRAWINGS

The invention will be further explained by reference to the drawings in which an embodiment of a coupling of the invention is schematically shown.

DETAILED DESCRIPTION OF THE PREFERRED EMBODIMENTS

Figure 1:
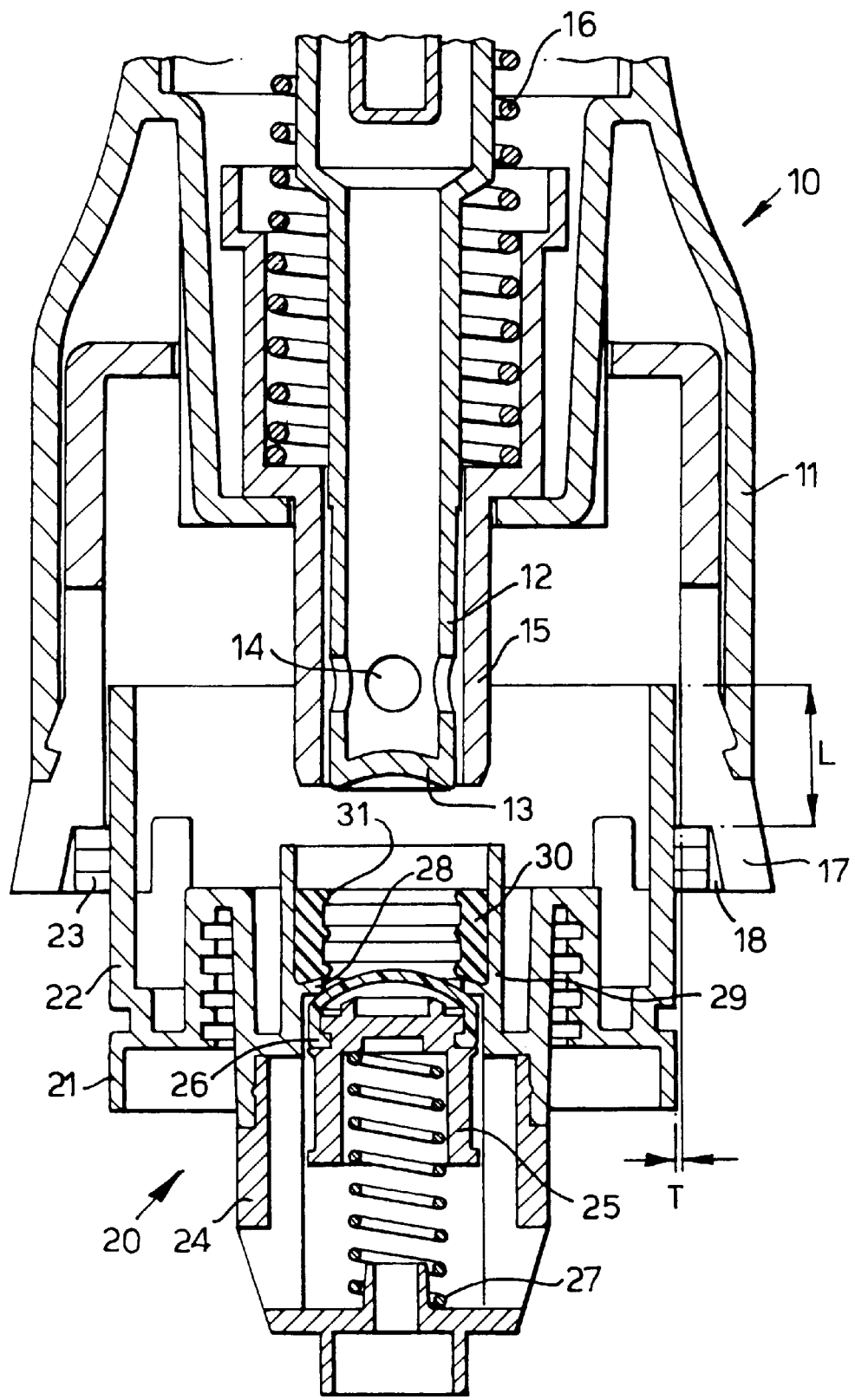
FIG. 1 shows a schematic cross-section of a coupling in accordance with the present invention, at the first stage of establishing a connection.

FIG. 1 shows a coupling for interconnecting two hollow bodies, such as a collapsible or rigid container and a tube. The coupling comprises a first interconnectable member 10 comprising a housing 11 and, fitted within the housing 11, a hollow post 12 of which the interior communicates with the interior of the body to which the first member is attached. The post 12 has a closed end 13 and four openings 14 situated behind the closed end 13. The post 12 is surrounded by a seal sleeve 15 which is biased by a spring 16 into a position covering the openings 14 to prevent outflow from the interior of the post 12. The housing 11 is fitted with a cylindrical key 17, which is provided with spiral grooves 18 on its inner side and which preferably has an inner diameter within a range from 40 to 80 mm.

FIG. 1 further shows a second interconnectable member 20 comprising a cap 21 having a cylindrical portion or wall 22 having an outer diameter smaller than the inner diameter of the key 17 and provided with two lugs or projections 23 on its outer side. The projections 23 are each located at a distance from the end of the cylindrical wall 22, so that the second member 20 must be inserted into the first member over a certain length "L", for example 13 mm, before the projections 23 arrive at the beginning of the corresponding grooves 18. Said length "L" should preferably be in excess of 10 mm (and, for practical reasons, preferably be smaller than 25 mm).

Conversely, grooves can be provided on the outer side of the cap 21. In that case, projections should be provided on the inner side of a cylindrical wall in the first member located at a certain distance from the end the said wall. The pitch of the grooves 18 preferably exceeds the inner radius of the key 17, so as to enable connection through limited rotation of the members 10, 20.

A basket 24 is fitted in the under side of the cap 21, which basket 24 comprises a piston 25 provided with a piston head 26. The basket 24 and cap 21 form a hollow sheath. The piston 25, 26 is biased by means of a spring 27 into a position closing an aperture 28 in the cap 21. The cap 21 comprises an annular raised edge 29, which has an inner diameter substantially equal to or slightly larger than the outer diameter of the seal sleeve 15 of the first member 10. A rubber ring 30 is fitted inside the annular edge 29, which ring 30 has a height smaller than the height of the annular edge 29 and has an inner diameter substantially equal to or slightly larger than the outer diameter of the post 12 of the first member 10. The ring 30 is provided with three annular ridges 31 on its inner surface, which will improve the close fit and, upon disconnection of the members 10, 20, will wipe the post 12 as it is drawn through the ring 30.

The piston head 26 is made of an flexible material, and its surface is convex. If the surface of the closed end 13 of the post 12 is concave, with the radius of the piston head 26 being selected smaller than the radius of the closed end 13 of the post 12, any liquid present between the said surfaces is displaced during connection of members 10, 20 and liquid build-up between the said surface, which results in spillage during disconnection of the members 10, 20, is avoided.

FIG. 1 shows the first stage of establishing the interconnection between the members 10 and 20. The tolerance "T" between the wall 22 and the key 17 (i.e., half the difference between the inner diameter of the key 17 and the outer diameter of the wall 22) amounts to 0.5 mm and preferably lies within a range from to 0.3 to 1.0 mm, or, more generally, within a range from 0.5 to 2% of the inner diameter of the key 17. Owing to this tolerance the cap can be easily inserted in the said key 17. If the ratio of this tolerance "T" and the length "L" over which the second members must be inserted into the first member (i.e., "T/L") is smaller than 0.10, the centering of the members with respect to each other will occur effectively and automatically and the risk of any of the projections 23 missing the beginning of the grooves 18 is avoided. Also, the post 12 and the piston 24 will also center automatically during the next stage of establishing the connection.

It is noted that the coupling may comprise two or more of the said projections and corresponding grooves, with at least two of the projections being different in shape and/or width and the corresponding grooves being matched accordingly. In an environment where several containers with different contents are being used, a mix-up of interconnectable members can be avoided by using different combinations of such different projections. The advantages of employing couplings with the ratio "T/L" in the fore-mentioned range are all the more noticeable when the number of (different) projections in a particular coupling increases.

Figure 2:
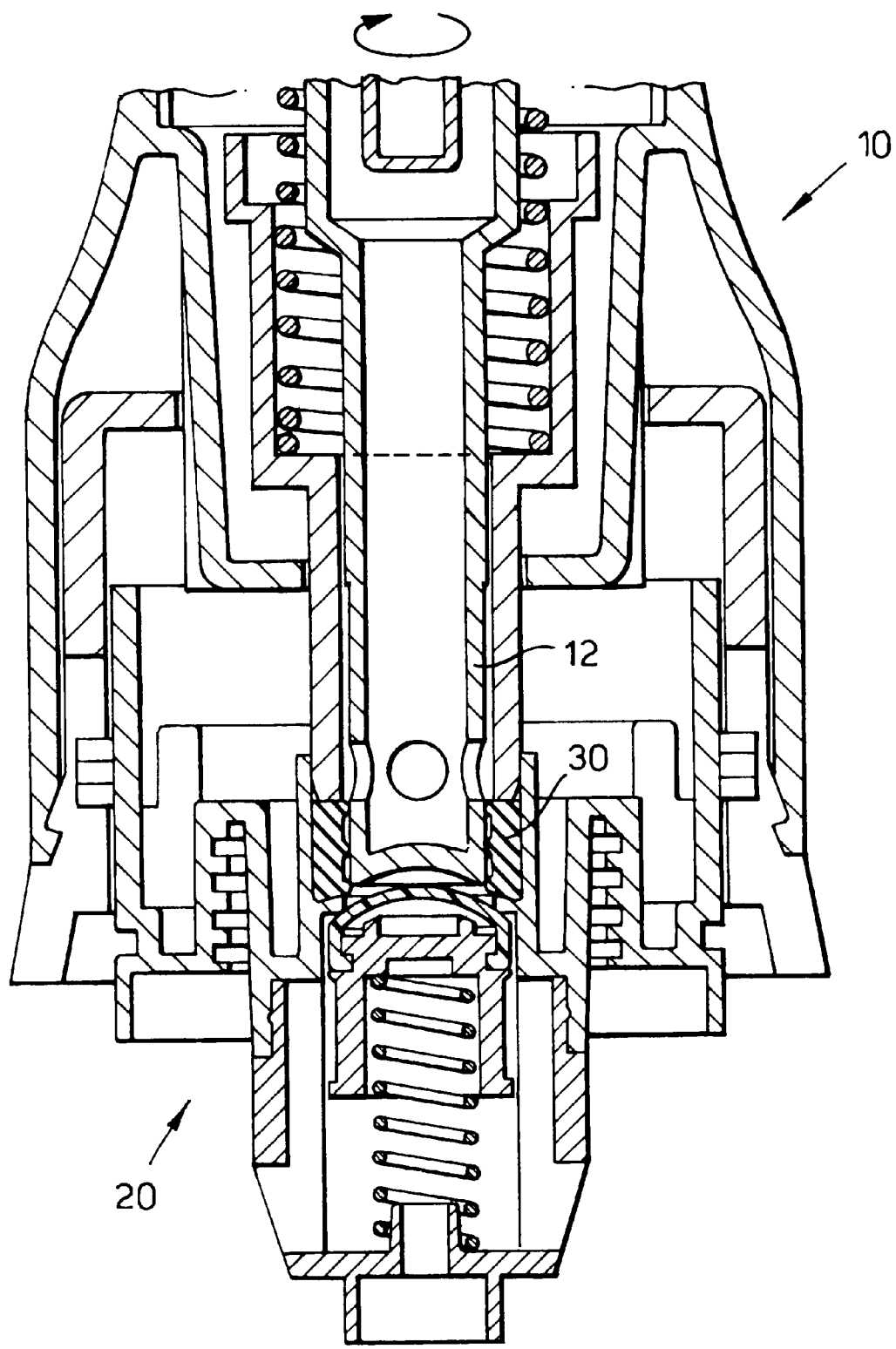
FIGS. 2 and 3 show a schematic cross-section of the coupling of FIG. 1, respectively at the second and third stage of establishing a connection.
Figure 3:
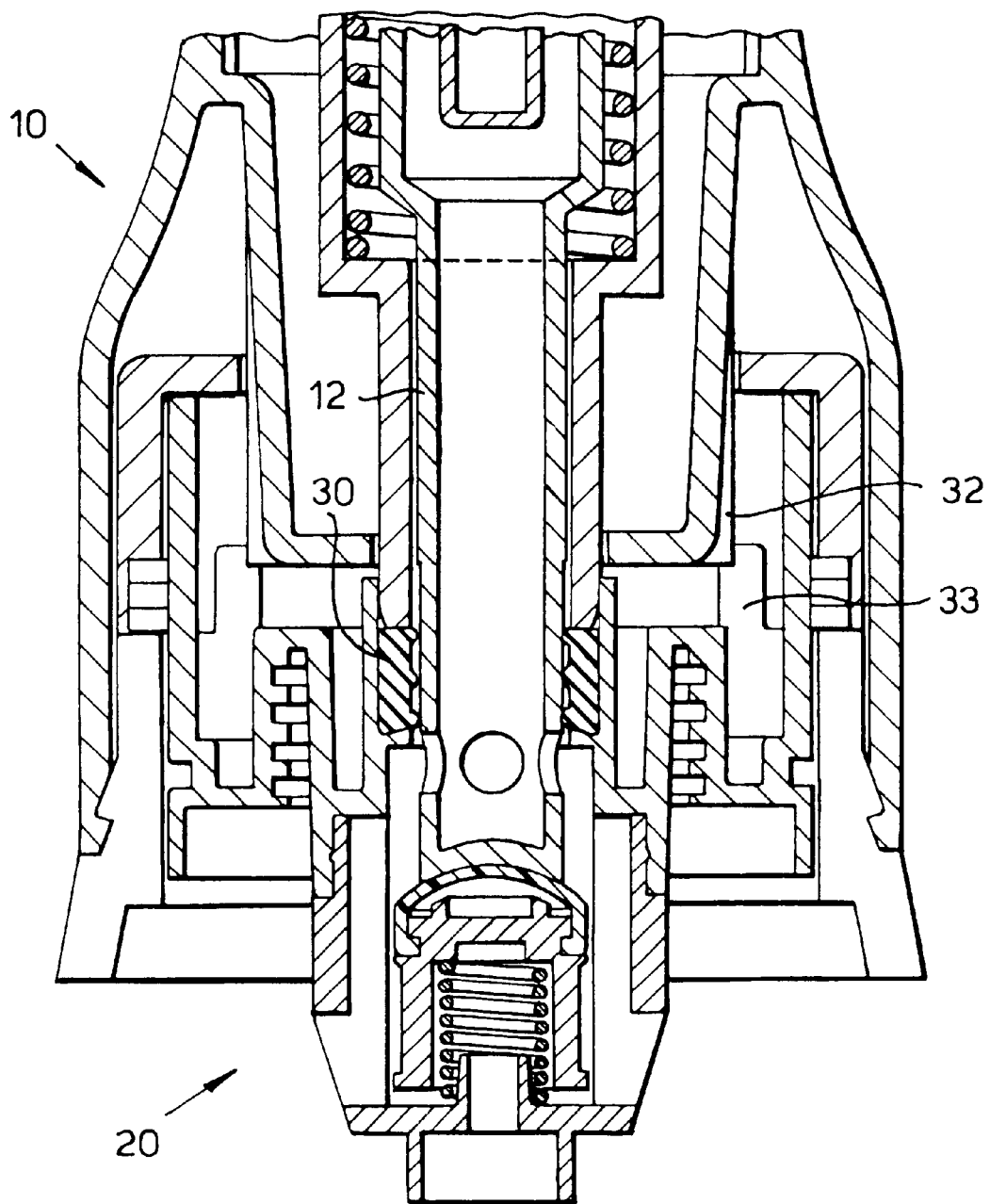

After insertion and centering, the members 10 and 20 are, as shown in FIGS. 2 and 3, rotated with respect to one another, thus establishing contact between the seal sleeve 15 and the rubber ring 30. During further rotation, the post 12 starts moving relative to the biased seal sleeve 15 because the latter is halted by the said ring 30. By this action the post 12 is now inserted in and surrounded by the ring 30 and the ring 30 is (slightly) compressed in the axial direction by the seal sleeve 15 as result of which the ring 30 begins to expand (slightly) in the radial direction towards the post 12. In this stage, the friction between the post 12 and the ring 30 is still relatively low, so as to allow easy rotation of the members by an operator.

FIG. 3 shows the final stage of establishing the connection. The members 10, 20 have been rotated over a total angle of approximately 45° and the ring 30 is compressed to such an extend that it completely seals off the post 12. The shape of the inner side of the ring 30 is now adapted to the shape of the post 12 and a close fit is obtained, even if the post 12 has been subjected to considerable wear after several years of use. One of the members may be provided with a cam 32, whereas the other member is provided with a thin plastic finger 33. The cam 32 and finger 33 are positioned such that, during rotation of the members 10, 20, the cam 32 passes the finger 33, causing the finger 33 to bend and, substantially simultaneously to establishing an adequate connection, snap back into its original position so as to produce an audible sound, e.g. a distinct click, and warn the operator that no further rotation is required.

Alternatively, a finger can be provided in the key 17 at the end of at least one of the grooves 18. Once the projections 23 reach the end of their respective grooves and the members 10, 20 are rotated slightly further, the projection or projections 23 will pass the finger or fingers. Thus, the finger or fingers are caused to bend and snap back in manner similar to that described above or, in case of a rigid finger, the projection is halted until it slips abruptly and collides with a stop positioned behind (as seen in the direction of movement of the projection) the finger.

In a further development of the invention, one of the two members includes or is connected to a chamber having means for detecting the presence of liquid in the chamber. Preferably, this will be the member which is connected to a tube. This preferred feature is useful in systems handling a liquid product where it is necessary or desirable to detect that the container has emptied and then shut off a pump and/or sound an alarm calling for the container to be replaced. For detecting liquid in the chamber, the chamber may contain a Reed-element or spaced apart electrodes so that the liquid when present provides a conductive path between the electrodes. Whatever means are used to detect the presence of liquid, it may be desirable for the chamber to have a valve which is biased closed but arranged open to admit air to the chamber in the event that a pre-determined sub-atmospheric pressure is created within the chamber, for example if a pump drawing from the chamber is continuing to run when the supplying container is empty.

Although the form of the coupling according to the invention was described particularly for the application indicated above, it can also be employed in other applications where it would be advantageous to provide a coupling preventing leakage from two hollow bodies when these are disconnected and also minimising spillage during the said disconnection. Thus, the invention is not restricted to the above described embodiment which can be varied in a number ways within the scope of the claims.

What is claimed is:

1. A coupling for interconnecting two hollow bodies, the coupling comprising first and second interconnectable members (10, 20) for attachment of each one to an orifice of a respective body so as to allow fluid flow between the interiors of the bodies when interconnected by the coupling and to seal the orifices when uncoupled, the first member (10) comprising a hollow post (12) of which the interior communicates with the interior of the body to which the first member (10) is attached, the hollow post (12) having a closed end (13) and at least one opening (14) behind the end (13), the first member (10) further comprising a sleeve (15) around the post (12) biased into a position sealing the opening (14), the second member (20) comprising a piston (25, 26) within a hollow sheath (21, 24) of which the interior communicates with the interior of the body to which the second member (20) is attached, the piston (25, 26) being biased into a position closing an aperture (28), the post (12), sleeve (15), piston (25, 26) and sheath (21, 24) being configured such that, upon connection of the members (10, 20), the closed end (13) of the post (12) extends through the aperture (28) in the sheath (21, 24) thereby displacing the piston (25, 26) against its bias, displacing the sleeve (15), against its bias to a position for uncovering the opening (14) and allowing flow between the hollow interiors of the sheath (21, 24) and the post (12), characterized in that, upon connection of the members (10, 20), an annular seal (30) is present between the sheath (21, 24) and the sleeve (15), which seal (30) is activated by the sleeve (15) so as to establish a close fit around the post (12) wherein the seal (30) is an elastic ring which is compressed in the axial direction and expanded in the radial direction towards the post (12) so as to establish a close fit around the post (12).

2. A coupling according to claim 1, wherein the sheath (21) extends into an annular, raised edge (29) which provides a seat for the elastic ring (30) and which limits or prevents expansion of the ring (30) in the radial direction away from the post (12).

3. A coupling according to claim 1, wherein the inner diameter of the ring (30) is equal to or larger than the outer diameter of the post (12).

4. A coupling according to claim 1, wherein the seal (30) comprises at least one annular ridge (31) on its inner surface.

5. A coupling according to claim 1, wherein the piston head (26) is made of an flexible material, the surface of the piston head (26) is convex, the surface of the closed end (13) of the post (12) is concave, and wherein the radius of the piston head (26) is smaller than the radius of the closed end (13) of the post (12).

6. A coupling according to claim 1, wherein the first member (10) comprises a cylindrical wall (17), the second member comprises a cylindrical wall (21) having an outer diameter that is smaller than the inner diameter of the wall (17) of the first member (10), the cylindrical wall (17) of first member (10) being provided with at least one projection or at least one groove (18) on its inner side and the cylindrical wall (21) of the second member (20) being provided with a corresponding groove or projection (23), respectively, on its outer side, the projection being located at a distance from the end the respective cylindrical wall, so that the members (10, 20) must be inserted into one another over a certain length (L) before the projection arrives at the beginning of the groove, wherein the ratio of the tolerance (T), between the inner diameter of the first member (10) and the outer diameter of the second member (20), and the said length (L) is smaller than 0.10.

7. A coupling according to claim 6, wherein one of the members (10, 20) comprises two or more projections and the other member comprises a corresponding number of grooves.

8. A coupling according to claim 1, wherein one of the members (10, 20) is attached to an orifice of a container and the other of the members is attached to a tube.

9. A coupling according to claim 1, wherein one of the members is provided with a cam (32), whereas the other member is provided with a thin plastic finger (33), the cam (32) and finger (33) being positioned such that, upon connection of the members (10, 12), the cam (32) passes the finger (33), causing the finger (33) to bend and, simultaneously to establishing an adequate connection, to snap back into its original position so as to produce an audible sound.

10. A coupling according to claim 1, wherein one of the two said members (10, 20) includes or is connected to a chamber having means for detecting the presence or absence of a liquid.

* * * * *